US012780686B2

(12) United States Patent
Kim et al.

(10) Patent No.: US 12,780,686 B2
(45) Date of Patent: Nov. 3, 2026

(54) HEAT EXCHANGER CAPABLE OF COOLING COOLANT OF EXTERNAL PLANT AND SEWAGE TREATMENT DEVICE COMPRISING SAME

(71) Applicant: BKT CO., LTD., Daejeon (KR)

(72) Inventors: Dong Woo Kim, Daejeon (KR); Dae Hwan Rhu, Yeoju-si (KR); Jong Goo Kim, Daejeon (KR); Jung Hoon Kim, Ansan-si (KR); Bong Choel Choi, Daejeon (KR)

(73) Assignee: BKT CO., LTD., Daejeon (KR)

( * ) Notice: Subject to any disclaimer, the term of this patent is extended or adjusted under 35 U.S.C. 154(b) by 432 days.

(21) Appl. No.: 18/494,978

(22) Filed: Oct. 26, 2023

(65) Prior Publication Data

US 2024/0051846 A1 Feb. 15, 2024

Related U.S. Application Data

(63) Continuation of application No. PCT/KR2022/006811, filed on May 12, 2022.

(30) Foreign Application Priority Data

Jun. 22, 2021 (KR) ........................ 10-2021-0080674

(51) Int. Cl.
*C02F 1/22* (2023.01)
*C02F 3/00* (2023.01)

(52) U.S. Cl.
CPC .................. *C02F 1/22* (2013.01); *C02F 3/00* (2013.01); *C02F 2209/02* (2013.01)

(58) Field of Classification Search
CPC ........... C02F 2209/02; C02F 2103/023; Y02A 20/146; G06F 1/20
(Continued)

(56) References Cited

U.S. PATENT DOCUMENTS 11,959,695 B2 * 4/2024 Lee ....................... F25D 29/008
2021/0123669 A1 * 4/2021 Lee .................... H05K 7/20836

FOREIGN PATENT DOCUMENTS

CN 102711417 A 10/2012
CN 107726424 A 2/2018
(Continued)

OTHER PUBLICATIONS

JP-2021077357-A translation.*

*Primary Examiner* — Jon T. Schermerhorn, Jr.
(74) *Attorney, Agent, or Firm* — Dinsmore & Shohl LLP; Yongsok Choi, Esq.

(57) ABSTRACT

Disclosed are a heat exchanger capable of cooling a coolant and a sewage treatment plant comprising same. An aspect of the present embodiment provides a sewage treatment plant which cools a coolant for dissipating heat of each component inside a data center, the sewage treatment plant comprising at least one removal means, for receiving sewage and removing organic material and pollutants in the sewage, and a cooling pipe, through which a coolant which has dissipated the heat of each component inside the data center flows, disposed inside the removal means so as to induce heat exchange between the treated water, from which organic material and pollutants of the sewage have been removed, and the coolant flowing through the cooling pipe, thereby lowering the temperature of the latter.

2 Claims, 13 Drawing Sheets

(58) Field of Classification Search
USPC ........................................................ 165/104.11
See application file for complete search history.

(56) References Cited

FOREIGN PATENT DOCUMENTS

| | | | | |
|---|---|---|---|---|
| JP | 2002013895 A | | 1/2002 |
| JP | 2021077357 A | * | 5/2021 |
| KR | 1020000013589 A | | 3/2000 |
| KR | 1020170073366 A | | 6/2017 |
| KR | 102215648 B1 | | 2/2021 |

* cited by examiner

HEAT EXCHANGER CAPABLE OF COOLING COOLANT OF EXTERNAL PLANT AND SEWAGE TREATMENT DEVICE COMPRISING SAME

CROSS-REFERENCE TO RELATED APPLICATIONS

The present patent application is a continuation of International Application No. PCT/KR2022/006811 filed on May 12, 2022, which claims priority under 35 U.S.C. § 119(a) to Korean Patent Application number 10-2021-0080674, filed in the Korean Intellectual Property Office on Jun. 22, 2021, the entire disclosure of which is incorporated herein by reference.

TECHNICAL FIELD

The present disclosure relates to a heat exchanger to cool down a coolant of external plants without extra power consumption in addition to the circulation of the coolant, and a sewage treatment plant including the same.

BACKGROUND ART

Contents described in this part merely provide background information of the present embodiment, and do not constitute the prior art.

A data center is a facility where various data are collected by operating hundreds of servers at the very least to tens of thousands of servers at the most. The data center stores customer and company information, etc., chiefly, in the IT industry.

Currently, as data are heavily increased due to the activation of mobile devices, social network services (SNSs), etc., companies that build data centers are increased.

However, the data center is called an “electric hippo” because the data center requires a large amount of electricity used and needs to be always run. As an example, the amount of electricity used for data centers that have been installed at more than 150 places nationwide in Korea reaches 2.8 billion kilowatts yearly in 2016. The amount of electricity is a numerical value that occupies of 7 to 8 percentage of the amount of electricity used for the industry. In particular, a lot of power is used to cool high heat that is generated from servers, storage and network equipment of the data centers.

As an eco-friendly scheme for minimizing power consumption and lowering a temperature of the data center, there is a method of using a nearby sea, river, or lake or using treatment water of a sewage treatment plant.

In this method, power consumption is reduced, and heat of the data center is cooled by cooling the heat by using seawater or freshwater of a nearby sea, river, or lake. However, this method is inconvenient because separate post-processing needs to be accompanied because a temperature of seawater or freshwater that is subjected to the exchange of heat with a coolant rises. Furthermore, the corresponding method causes restrictions in geographical conditions for building a data center that is built in a large city recently because the data center needs to be close to the sea, a river, or a lake.

Accordingly, an additionally suggested method is a method of operating a data center by immersing the data center in treated water that has been treated in a sewage treatment plant. The treated water from the sewage treatment plant has no problem to cool down a coolant that flows through the data center because a water temperature of the treated wastewater is about 25° C. in the summer. However, if the data center is immersed in the treated wastewater, this method has restrictions in discharging the treated wastewater because the treated wastewater could be contaminated due to the immersion. Furthermore, there is a problem in that the size of a sewage treatment plant needs to be increased because a space for storing the treated wastewater needs to be increased to the extent that the data center can be immersed.

Meanwhile, as a method of spraying the treated wastewater from the sewage treatment plant in a spray form, a pipe form, etc., there is a scheme for directly cooling heat of the data center or lowering a temperature of the coolant by using a cooling tower. However, the quality of the treated wastewater slightly falls short of being directly used as a coolant no matter how the wastewater is treated in the sewage treatment plant. Furthermore, a large amount of chemicals needs to be used in the treated wastewater in order to prevent precipitation or a scale, etc., and problems, such as the generation of odor, may also occur upon evaporation.

Furthermore, it is difficult to directly discharge the treated wastewater that has been used for spray because the treated wastewater is contaminated again in the spray process, and the treated wastewater that has been used for spray essentially requires a re-treatment process, etc. The treated wastewater is continuously evaporated due to the spray and is concentrated within a cooling tower because salts in treated wastewater are not removed during treatment. Accordingly, some of circulated water needs to be continuously discharged because corrosiveness and a scale occur in the treated wastewater. Accordingly, there is a problem in that the treated wastewater is continuously consumed.

DISCLOSURE

Technical Problem

An embodiment of the present invention has an object of providing a heat exchanger to minimize power consumption and also lower a temperature of a coolant that will cool a data center through the exchange of heat between the coolant and the outside, and a sewage treatment plant including the same.

Technical Solution

According to an aspect of the present invention, there is provided a sewage treatment plant to cool down a coolant that radiates heat from each component within a data center by using treated wastewater as a cooling water, including one or more treatment components receive sewage and remove organic matters and contaminants in the sewage. A cooling pipe into which the coolant that has radiated heat from each component within the data center flows is disposed within the removal component, and a temperature of the coolant that flows into a cooling pipe is lowered by inducing the exchange of heat between the cooling water within the sewage treatment plant and the coolant flowing into the cooling pipe.

According to an aspect of the present invention, the cooling water includes sewage and wastewater that has been introduced into the sewage treatment plant or treated wastewater that is being treated in the sewage treatment plant or on which treatment has been completed.

According to an aspect of the present invention, the sewage treatment plant senses a water temperature of the coolant that flows into the cooling pipe or a water temperature of the treated water.

According to an aspect of the present invention, the sewage treatment plant determines whether the water temperature of the cooling water is greater than a preset reference value based on a sensed sensing value.

According to an aspect of the present invention, the sewage treatment plant determines whether a difference between the water temperature of the coolant and the water temperature of the cooling water is greater than a preset reference value based on a sensed sensing value.

According to an aspect of the present invention, the sewage treatment plant controls whether to distribute the coolant to the cooling pipe that has been disposed within each treatment component, based on a result of the determination.

According to an aspect of the present invention, there is provided a sewage treatment plant to cool down a coolant that radiates heat from each component within a data center by using treated wastewater as a cooling water, including a plurality of biological reactors each configured to remove organic matters and nitrogen within sewage introduced therein by using microbes, to have disposed therein a cooling pipe into which the coolant that has radiated heat from each component within the data center flows, and to lower a temperature of the coolant that flows into the cooling pipe by inducing the exchange of heat between the cooling water and the coolant that flows into the cooling pipe, a sensor configured to sense a water temperature of the coolant that flows into the cooling pipe or a water temperature of the cooling water, a valve configured to control a flow of the coolant that flows into the cooling pipe within each biological reactor, and a controller configured to control an operation of the valve based on a sensing value of the sensor.

According to an aspect of the present invention, the controller determines whether the water temperature of the cooling water is greater than a preset reference value or a difference between the water temperature of the coolant and the water temperature of the cooling water is greater than the preset reference value based on the sensing value of the sensor.

According to an aspect of the present invention, the controller controls whether to distribute the coolant to the cooling pipe within each biological reactor based on a result of the determination.

According to an aspect of the present invention, the controller increases the number of biological reactors to which the coolant is distributed when a difference between a water temperature of treatment water or the water temperature of the coolant and the water temperature of the cooling water is greater than the preset reference value.

According to an aspect of the present invention, there is provided a sewage treatment plant to cool down a coolant that radiates heat from each component within a data center by using treated wastewater as a cooling water, including a plurality of sewage treatment apparatuses each configured to remove organic matters and nitrogen within sewage introduced therein by using a filter medium, to have disposed therein a cooling pipe into which the coolant that has radiated heat from each component within the data center flows, and to lower a temperature of the coolant that flows into the cooling pipe by inducing the exchange of heat between the cooling water and the coolant that flows into the cooling pipe, a sensor configured to sense a water temperature of the coolant that flows into the cooling pipe or a water temperature of the cooling water, a valve configured to control a flow of the coolant that flows into the cooling pipe within each biological reactor, and a controller configured to control an operation of the valve based on a sensing value of the sensor.

According to an aspect of the present invention, there is provided a heat exchange apparatus disposed within a sewage treatment plant and configured to perform the exchange of heat between a cooling pipe into which a coolant that has radiated heat from each component within a data center flows and the outside, including a body implemented by using a component having thermal conductivity equal to or greater than a preset reference value, implemented to have a shape having a preset area, and having a plurality of through holes therein, and a support part implemented by using a component having thermal conductivity equal to or greater than a preset reference value, connected to one end of the body, and configured to have a shape in which the cooling pipe is capable of being seated and to have the cooling pipe seated therein. The body is connected to a wall body of a component to be disposed within the sewage treatment plant through an end thereof on a side opposite to the one end connected to the support part.

According to an aspect of the present invention, the body and the support part is implemented by using aluminum or stainless steel.

According to an aspect of the present invention, the support part has a semicircle.

According to an aspect of the present invention, the support part includes an anti-detachment part that has a greater thickness than other portion of the support part, that is formed in each end of the support part, and that prevents the detachment of the cooling pipe seated in the support part.

According to an aspect of the present invention, the heat exchange apparatus further includes a fixing plate connected to the end on the side opposite to the body and disposed in a location in which the heat exchange apparatus will be disposed in the wall body and a fixing member configured to fix the fixing plate and the wall body.

According to an aspect of the present invention, the body is connected to the wall body at a preset angle.

According to an aspect of the present invention, there is provided a heat exchange apparatus disposed within a sewage treatment plant and configured to perform the exchange of heat between a cooling pipe into which a coolant that has radiated heat from each component within a data center flows and the outside, including a body implemented by using a component having thermal conductivity equal to or greater than a preset reference value, implemented to have a shape having a preset area, and a support part implemented by using a component having thermal conductivity equal to or greater than a preset reference value, connected to one end of the body, and configured to have a shape in which the cooling pipe is capable of being seated and to have the cooling pipe seated therein. The body is connected to a component to be disposed within the sewage treatment plant at a preset slope through an end thereof on a side opposite to the one end connected to the support.

According to an aspect of the present invention, in the support part, if the heat exchange apparatus is disposed in a component within the sewage treatment plant, the support part and the cooling pipe are connected to a surface toward a bottom surface of the component within the sewage treatment plant, among both surfaces of the body.

According to an aspect of the present invention, there is provided a heat exchange apparatus disposed on a strainer block within a sewage treatment plant and configured to perform the exchange of heat between a cooling pipe into which a coolant that radiates heat from each component within a data center flows and the outside, including a support part implemented by using a component having thermal conductivity equal to or greater than a preset reference value, connected to the strainer block, and configured to have a shape in which the cooling pipe is capable of being seated and to have the cooling pipe seated therein.

According to an aspect of the present invention, the strainer block is implemented by using a component having thermal conductivity equal to or greater than a preset reference value.

According to an aspect of the present invention, there is provided a heat exchange apparatus disposed on a strainer block within a sewage treatment plant and configured to perform the exchange of heat between a cooling pipe into which a coolant that has radiated heat from each component within a data center flows and the outside, including a body implemented by using a component having thermal conductivity equal to or greater than a preset reference value, implemented to have a shape having a preset area, and having a plurality of through holes therein, and a support part implemented by using a component having thermal conductivity equal to or greater than a preset reference value, connected to one end of the body, and configured to have a shape in which the cooling pipe is capable of being seated and to have the cooling pipe seated therein. The body is connected to one surface of the strainer block through an end thereof on a side opposite to the one end connected to the support part.

According to an aspect of the present invention, the strainer block is implemented by using a component having thermal conductivity equal to or greater than a preset reference value.

According to an aspect of the present invention, there is provided a heat exchange apparatus disposed on a support frame that supports a strainer block within a sewage treatment plant and configured to perform the exchange of heat between a cooling pipe into which a coolant that radiates heat from each component within a data center flows and the outside, including a support part implemented by using a component having thermal conductivity equal to or greater than a preset reference value, connected to the support frame, and configured to have a shape in which the cooling pipe is capable of being seated and to have the cooling pipe seated therein.

According to an aspect of the present invention, the strainer block is implemented by using a component having thermal conductivity equal to or greater than a preset reference value.

According to an aspect of the present invention, the support frame prevents the detachment of the strainer block by contacting with one surface of the strainer block.

According to an aspect of the present invention, there is provided a strainer block configured to spatially separate a reaction tank configured to remove contaminants within sewage and wastewater introduced therein and a treated water storage tank configured to store treated water from which the contaminants have been removed through the reaction tank, including a body implemented by using a component having thermal conductivity equal to or greater than a preset reference value, implemented to have a shape having a preset area, and having a plurality of through holes therein, and a support part implemented by using a component having thermal conductivity equal to or greater than a preset reference value, connected to one end of the body, and configured to have a shape in which the cooling pipe is capable of being seated and to have the cooling pipe seated therein. The strainer block is connected to the body through an end thereof on a side opposite to one end thereof connected to the support part within the body on one surface of the strainer block. The strainer block is implemented by using a component having thermal conductivity equal to or greater than a preset reference value.

According to an aspect of the present invention, there is provided a strainer block configured to spatially separate a reaction tank configured to remove contaminants within sewage and wastewater introduced therein and a treated water storage tank configured to store treated water from which the contaminants have been removed through the reaction tank, including a support part implemented by using a component having thermal conductivity equal to or greater than a preset reference value and configured to have a shape in which a cooling pipe is capable of being seated and to have the cooling pipe seated therein. The strainer block is connected to the support part on one surface of the strainer block. The strainer block is implemented by using a component having thermal conductivity equal to or greater than a preset reference value.

According to an aspect of the present invention, there is provided a strainer block configured to spatially separate a reaction tank configured to remove contaminants within sewage and wastewater introduced therein and a treated water storage tank configured to store treated water from which the contaminants have been removed through the reaction tank and supported by a support frame in one direction thereof, including a support part implemented by using a component having thermal conductivity equal to or greater than a preset reference value and configured to have a shape in which a cooling pipe is capable of being seated and to have the cooling pipe seated therein. The support part is connected to a side opposite to one surface where the support frame contacts with the strainer block. The strainer block and the support frame are each implemented by using a component having thermal conductivity equal to or greater than a preset reference value.

According to an aspect of the present invention, the support frame contacts with the strainer block on one surface of the support frame in a direction in which the treated water storage tank is disposed.

According to an aspect of the present invention, there is provided a strainer configured to spatially separate a reaction tank configured to remove contaminants within sewage and wastewater introduced therein and a treated water storage tank configured to store treated water from which the contaminants have been removed through the reaction tank, including a strainer block, a nozzle that is disposed in a nozzle hole formed in the strainer block, and a step in each face of which a fastening structure has been formed. The strainer includes a first nozzle socket having an improved clamping force with the strainer block and a second nozzle socket in which a fastening structure has been formed and which has an improved clamping force by being fastened to the first nozzle socket on one surface thereof, to the first nozzle socket and the strainer block on another surface thereof, and the nozzle on another surface thereof.

Advantageous Effects

As described above, according to an aspect of the present invention, there are advantages in that power consumption can be minimized, a temperature of a coolant that will cool a data center can be decreased through the exchange of heat between the coolant and the outside, and a temperature rise attributable to the exchange of heat with the coolant can be positively used in water treatment.

MODE FOR INVENTION

Figure 1A:
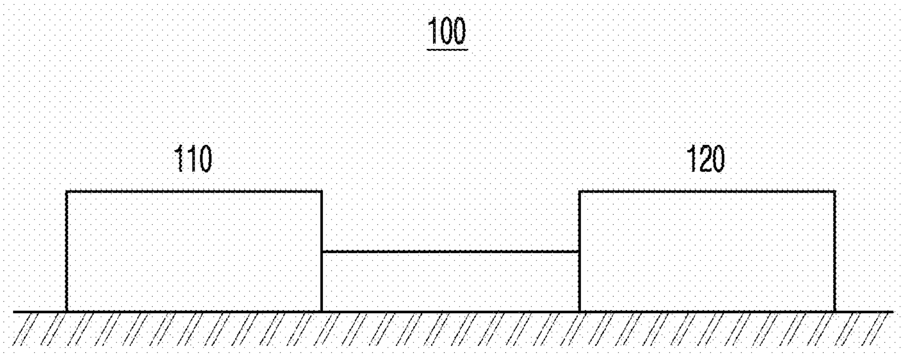
FIGS. 1A and 1B are diagrams illustrating a positional relation between a sewage treatment plant according to an embodiment of the present invention and a data center.

The present invention may be changed in various ways and may have various embodiments. Specific embodiments are to be illustrated in the drawings and specifically described. It should be understood that the present disclosure is not intended to be limited to the specific embodiments, but includes all of changes, equivalents and/or substitutions included in the spirit and technical range of the present disclosure. Similar reference numerals are used for similar components while each drawing is described.

Terms such as first, second, A, and B may be used to describe various components, but the components should not be restricted by the terms. The terms are used to only distinguish one component from another component. For example, a first component may be referred to as a second component without departing from the scope of rights of the present invention. Likewise, a second component may be referred to as a first component. The term "and/or" includes a combination of a plurality of related and described items or any one of a plurality of related and described items.

When it is described that one component is "connected" or "coupled" to the other component, it should be understood that one component may be directly connected or coupled to the other component, but a third component may exist between the two components. In contrast, when it is described that one component is "directly connected to" or "directly coupled to" the other component, it should be understood that a third component does not exist between the two components.

Terms used in this application are used to only describe specific embodiments and are not intended to restrict the present invention. An expression of the singular number includes an expression of the plural number unless clearly defined otherwise in the context. In this specification, a term, such as "include" or "have", is intended to designate the presence of a characteristic, a number, a step, an operation, a component, a part or a combination of them, and should be understood that it does not exclude the existence or possible addition of one or more other characteristics, numbers, steps, operations, components, parts, or combinations of them in advance.

All terms used herein, including technical terms or scientific terms, have the same meanings as those commonly understood by a person having ordinary knowledge in the art to which the present disclosure pertains, unless defined otherwise in the specification.

Terms, such as those defined in commonly used dictionaries, should be construed as having the same meanings as those in the context of a related technology, and are not construed as ideal or excessively formal meanings unless explicitly defined otherwise in the application.

Furthermore, each configuration, process, procedure, or method included in each embodiment of the present disclosure may be shared within a range in which the constructions, processes, procedures, or methods do not contradict each other technically.

Figure 1B:
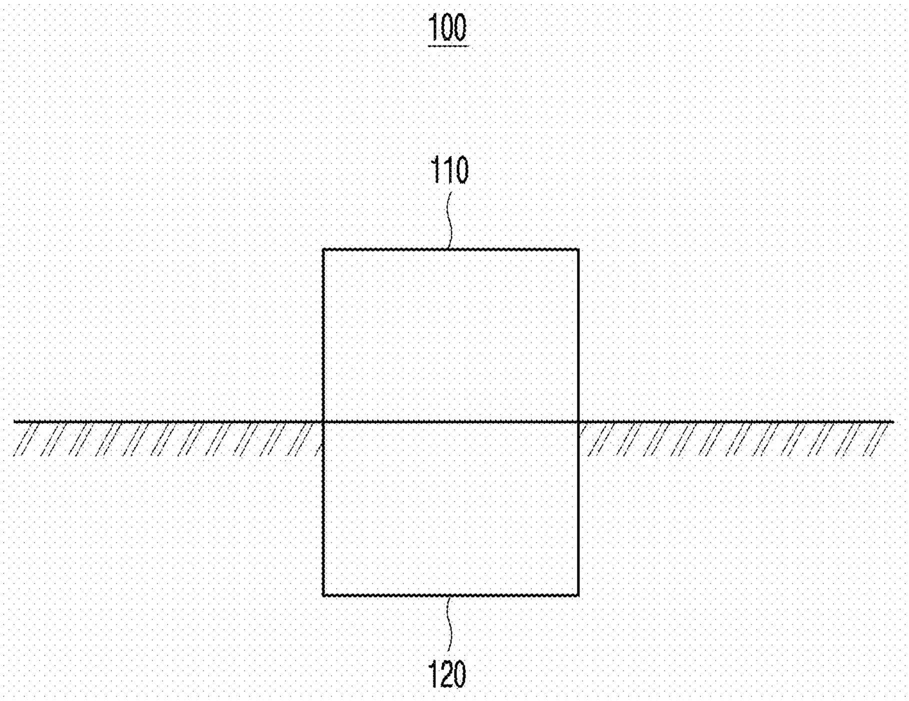
Figure 2:
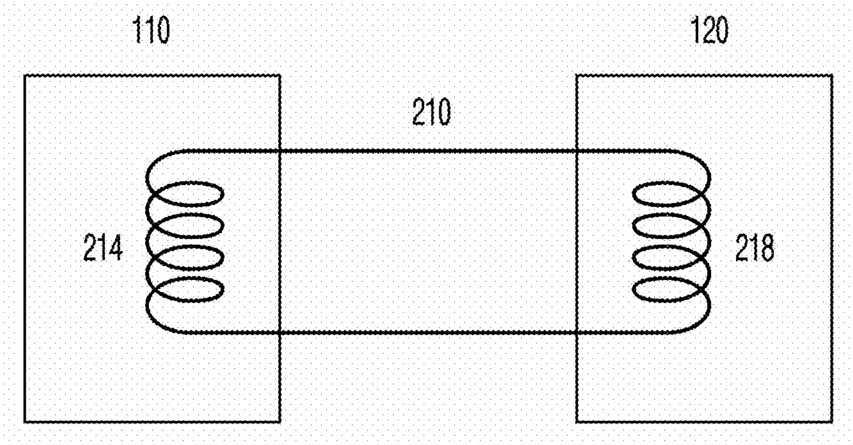
FIG. 2 is a diagram schematically illustrating a structure of a cooling pipe that flows between the sewage treatment plant according to an embodiment of the present invention and the data center.

FIGS. 1A and 1B are diagrams illustrating a positional relation between a sewage treatment plant according to an embodiment of the present invention and a data center. FIG. 2 is a diagram schematically illustrating a structure of a cooling pipe that flows between the sewage treatment plant according to an embodiment of the present invention and the data center.

The data center 110 is a facility in which various data are collected by operating hundreds of servers at the very least to tens of thousands of servers at the most. The data center 110 consumes considerable power and generates lots of heat because the data center needs to process a large amount of data and to be always run. Accordingly, the data center 110 essentially requires a coolant that flows within the data center 110 and cools each of the servers.

Conventionally, a coolant having a high temperature has been cooled while cooling servers in a way to perform a heat exchange by using a cooling tower or pumped water. However, the conventional method has a problem in that a lot of power is consumed in order to supply external air or water. The conventional method using the cooling tower has a problem with a supplement quantity according to a loss of a coolant. A conventional water-cooling method has a problem in that a large amount of water is consumed in order to cool the coolant.

In an operation of the data center 110, separately from a movement of reducing power consumption, there is a movement of minimizing power consumption, or the amount of water used in a heat radiation process of the data center 110.

Accordingly, a sewage treatment plant 120 is disposed at a location close to the data center 110 and cools a coolant that flows into the data center 110 by using cooling water within the sewage treatment plant 120 (hereinafter abbreviated as "cooling water"). In this case, the cooling water includes all of sewage and wastewater that has been introduced into the sewage treatment plant 120 for water treatment, treated water that is treated via each component within the sewage treatment plant 120, and treated water that is wholly treated via all the components within the sewage treatment plant 120. That is, the cooling water is a concept including all liquids that are introduced into the sewage treatment plant 120 and flow within the sewage treatment plant 120. The sewage treatment plant 120 does not separately consume power attributable to the supply of the air or water (service water) and does not consume cooling water because the cooling water is used to cool a coolant. Accordingly, the sewage treatment plant 120 is disposed at an arbitrary site regardless of whether water for regenerating a coolant is supplied and can cool the coolant of the data center 110.

Meanwhile, the sewage treatment plant 120 needs to be able to easily receive a coolant from the data center 110 or discharge the coolant to the data center 110 in order to cool the coolant by using cooling water. Accordingly, as illustrated in FIG. 1A, the sewage treatment plant 120 needs to be disposed to be close to the data center 110. The sewage treatment plant 120 may be disposed within a preset radius of the data center 110 on the ground.

However, the data center 110 needs to be disposed at a site at which electricity can be smoothly supplied because the data center consumes a large amount of power. The data center 110 may be disposed at any place without a great difficulty because the data center is not classified as an unpleasant facility. In contrast, equipment of the sewage treatment plant 120 is classified as an unpleasant facility, and it may be difficult to dispose the sewage treatment plant at a densely populated place. It is advantageous that the sewage treatment plant 120 is disposed to be close to the data center 110 in order to cool down water of the sewage treatment plant 120 to cool the coolant of the data center 110. In order to satisfy all of such conditions, the sewage treatment plant 120 may be disposed in the basement of a site of the data center 110 as illustrated in FIG. 1B. If the sewage treatment plant 120 is disposed at such a place, the sewage treatment plant 120 can smoothly receive a coolant that flows into the data center 110 and can cool the data center 110 because the sewage treatment plant 120 can be disposed at a place close to the data center 110 as much as possible without restriction on geographical conditions.

The coolant that flows within the data center 110 flows along a cooling pipe 214 formed to cool each component within the data center 110, and cools each component. The coolant having a high temperature flows into the sewage treatment plant 120 along a cooling pipe 210 that connects the data center 110 and the sewage treatment plant 120, and passes through each place or each tank of the sewage treatment plant 120. Cooling water that flows within or has been stored in each place or each tank of the sewage treatment plant 120 has a different temperature from season to season, and has a temperature of 8 to 13° C. in the winter season and a relatively low temperature of about 25° C. even in the summer season in an area having the same latitude as Korea. Accordingly, the coolant performs the exchange of heat with the cooling water within each place or each tank in the process of the coolant passing through each place or each tank of the sewage treatment plant 120. The temperature of the coolant is lowered, and the temperature of the cooling water is raised by the exchange of heat. The coolant having a high temperature flows into the data center 110 again along the cooling pipe 210, and cools each component within the data center 110.

The coolant flows along the cooling pipe formed within the data center 110 and the sewage treatment plant 120, and can smoothly perform heat radiation (of each component within the data center 110) and (its own) cooling even without consuming the least power consumption and cooling water.

Figure 3:
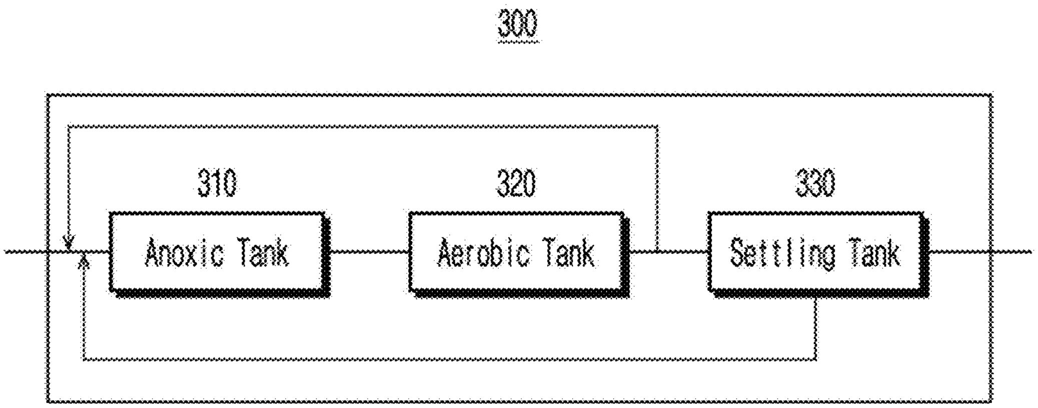
FIG. 3 is a diagram illustrating a construction of a biological reactor within the sewage treatment plant according to an embodiment of the present invention.

FIG. 3 is a diagram illustrating a construction of a biological reactor within the sewage treatment plant according to an embodiment of the present invention.

Referring to FIG. 3, the biological reactor 300 within the sewage treatment plant according to an embodiment of the present invention includes an anoxic tank 310, an aerobic tank 320, a settling tank 330, and a recycle pump (not illustrated). The sewage treatment plant 120 according to an embodiment of the present invention includes one or more biological reactors 300, sensors (not illustrated), valves (not illustrated), and cooling pipes (not illustrated), and a controller (not illustrated).

The anoxic tank 310 consumes organic matters within inflow water and degasses nitrate nitrogen into a nitrogen gas. A large amount of organic matters and ammonium nitrogen are included in the inflow water that is introduced into the anoxic tank 310. The anoxic tank 310 receives the inflow water, consumes the organic matters, and degasses the nitrate nitrogen into the nitrogen gas.

The aerobic tank 320 receives the inflow water that has gone through the anoxic tank 310, and oxidizes ammonium nitrogen into nitrate nitrogen. The aerobic tank 320 oxidizes ammonium nitrogen into nitrate nitrogen in the state in which organic matters are not present. Accordingly, the aerobic tank 320 receives and oxidizes the inflow water that has gone through the anoxic tank 310. However, the anoxic tank 310 requires nitrate nitrogen, whereas the aerobic tank 320 requires ammonium nitrogen. Accordingly, the recycle pump (not illustrated) supplies the anoxic tank 310 with nitrate nitrogen that has been oxidized by the aerobic tank 320 by internally recycling the nitrate nitrogen. Through such an internal recycle, the anoxic tank 310 receives nitrate nitrogen necessary for denitrification from the aerobic tank 320. The aerobic tank 320 may receive inflow water from which organic matters have been removed by the anoxic tank 310.

The settling tank 330 separates sludge from treated water that has gone through the aerobic tank 320 and discharges a supernatant. A large amount of microbes that denitrify nitrate nitrogen into the nitrogen gas within the anoxic tank 310 and a large amount of microbes that oxidize ammonium nitrogen into nitrate nitrogen within the aerobic tank 320 are included in the inflow water that is introduced into the settling tank 330. In order to prevent the washout of the microbes, the settling tank 330 receives the treated water that has gone through the aerobic tank 320, stores the treated water for a predetermined period, and separates the sludge. The recycle pump (not illustrated) internally retransfers the settled sludge to the anoxic tank 310.

In the biological reactor that operates as described above, a temperature of inflow water (cooling water) has a great influence on sewage treatment efficiency because biological treatment is performed by the activities of (denitrification or oxidization) microbes.

In the summer season, a water temperature of inflow water or cooling water rises. A rise of the water temperature raises the activity of microbes. The microbes can operate smoothly in the tanks 310 and 320 because the activity of the microbes is increased.

In contrast, in the winter season, a water temperature of inflow water or cooling water decreases. A decreasing in the water temperature reduces the activity of microbes. A unique operation of each of the tanks 310 and 320 is not smoothly performed due to the reduced activity of the microbes.

If the biological reactor that operates as described above is included in the sewage treatment plant 120, the exchange of heat between the cooling water in each tank and the coolant may result in the following effects. The exchange of heat occurs between the cooling water having a relatively low water temperature and the coolant having a relatively very high-water temperature due to the cooling of each component within the data center. Accordingly, the water temperature of the coolant falls, and the water temperature of the cooling water of each tank rises. In particular, in the winter season, the aforementioned problem occurs because the water temperature of the inflow water or cooling water of each tank is low. The same advantageous effect (for microbes) as that in the summer season may occur even without extra energy consumption (for raising the water temperature) because a water temperature of the cooling water (the inflow water) is raised due to the exchange of heat with the coolant. Accordingly, the sewage treatment plant 120 can increase the temperature of the cooling water even without an operation of separately consuming excessive energy in order to improve the activity of microbes in the winter season in the biological reactor.

In order to improve both cooling efficiency of the coolant and operation efficiency of the biological reactor, the sewage treatment plant 120 may operate as follows.

The sensor (not illustrated) senses a water temperature of the coolant that is introduced into the sewage treatment plant 120 and a water temperature of the cooling water in each tank of the biological reactor.

The cooling pipe (not illustrated) is disposed so that each biological reaction tank within the sewage treatment plant 120 passes through the tanks 310, 320, and 330 within the biological reaction tank.

The valve (not illustrated) controls a flow of the coolant toward the cooling pipe (not illustrated). The valve (not illustrated) controls whether the coolant will be introduced into each biological reaction tank and will be introduced into each tank within the biological reaction tank by controlling a flow of the coolant under the control of the controller (not illustrated).

The controller (not illustrated) controls an operation of the valve (not illustrated) based on a sensing value of the sensor (not illustrated). The controller (not illustrated) compares a water temperature of the introduced coolant and a water temperature of the cooling water in each tank within the biological reaction tank, and controls whether to perform the exchange of heat based on how much the coolant will be distributed to the biological reaction tank and into how many groups within the biological reaction tank the coolant will be distributed. The more the coolant is branched and distributed, the more area the exchange of heat occurs, so that a larger amount of heat can be exchanged at a faster speed.

The controller (not illustrated) determines whether a water temperature of the cooling water is greater than a preset reference value or a difference between a water temperature of the coolant and the water temperature of the cooling water is greater than the preset reference value. The preset reference value may be several tens of ° C. to 20° C. or more. As described above, when the water temperature of the cooling water is high, efficiency of the exchange of heat is inevitably low in one biological reaction tank or in any tank within the biological reaction tank. As aforementioned, water temperature or water temperature difference is greater than the preset reference value, the controller (not illustrated) controls the valve (not illustrated) so that the coolant is distributed to all of the biological reaction tanks and controls the valve (not illustrated) so that the coolant is distributed to all of the tanks even in each biological reaction tank. In contrast, when the aforementioned water temperature or water temperature difference is not greater than the preset reference value, the controller (not illustrated) reduces the number of biological reaction tanks to which the coolant is distributed or the number of tanks within each biological reaction tank because the efficient exchange of heat can occur sufficiently although the coolant is not distributed to all the places. The controller (not illustrated) can actively respond to a change in the water temperature of the cooling water within the sewage treatment plant by adjusting a heat exchange area between the coolant and the cooling water based on the water temperature.

Figure 4:
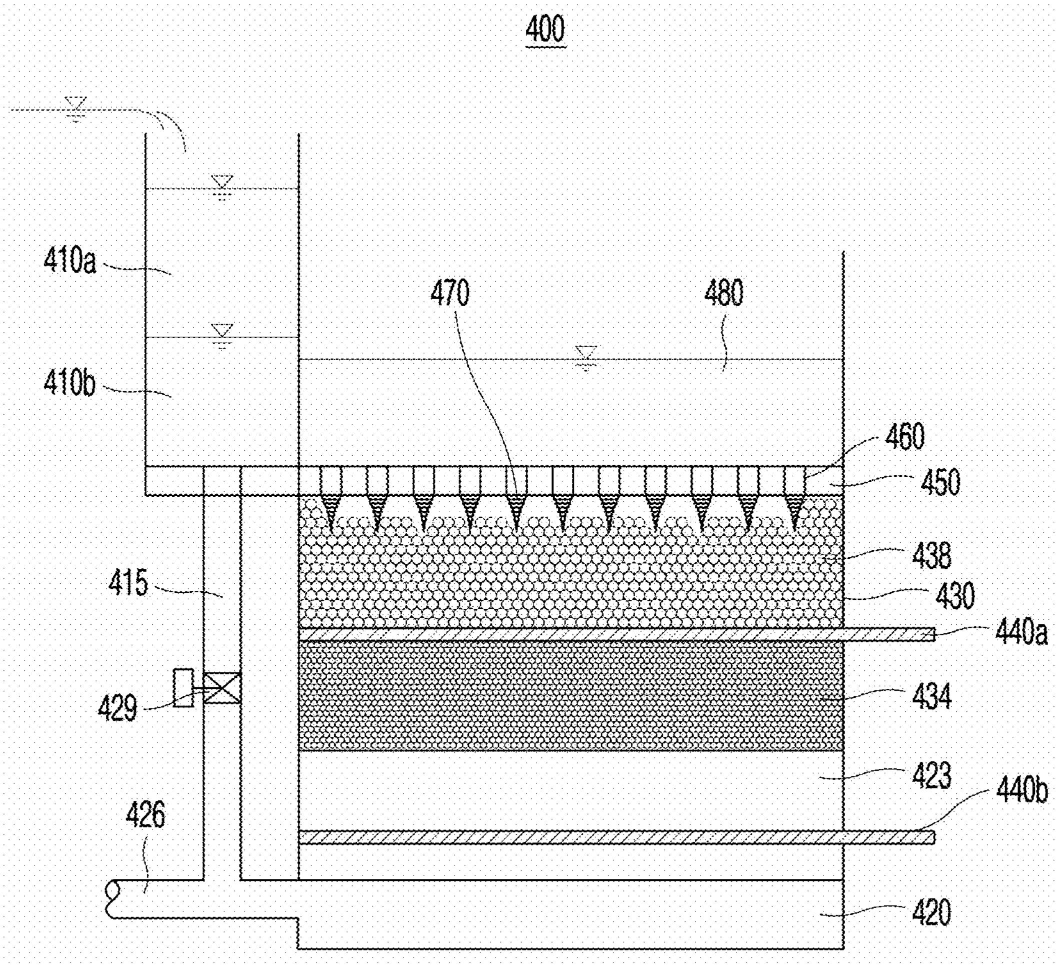
FIG. 4 is a diagram illustrating a construction of a sewage filtration apparatus within the sewage treatment plant according to an embodiment of the present invention.
Figure 5:
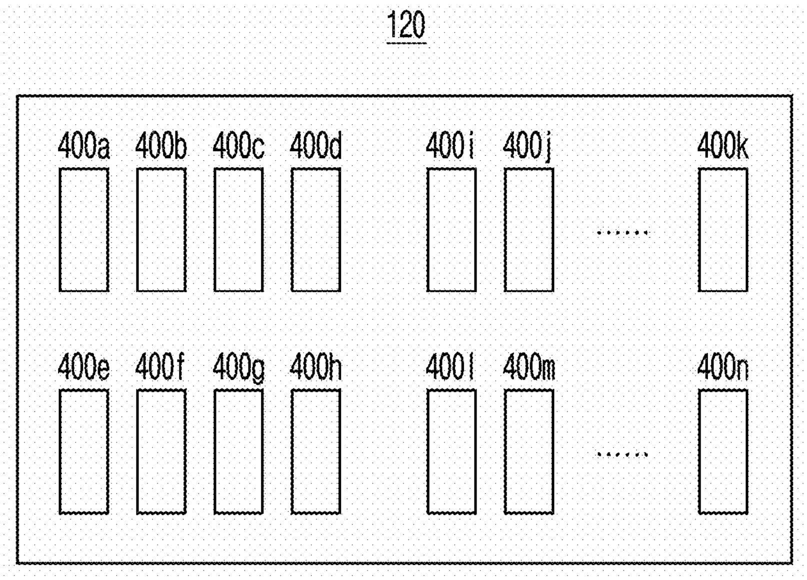
FIG. 5 is a diagram illustrating a construction of a sewage treatment plant in which the sewage filtration apparatus within the sewage treatment plant according to an embodiment of the present invention has been disposed.

FIG. 4 is a diagram illustrating a construction of a sewage filtration apparatus within the sewage treatment plant according to an embodiment of the present invention. FIG. 5 is a diagram illustrating a construction of the sewage treatment plant in which the sewage filtration apparatus within the sewage treatment plant according to an embodiment of the present invention has been disposed.

Referring to FIG. 4, the sewage filtration apparatus 400 within the sewage treatment plant according to an embodiment of the present invention includes an influent water box 410, a distribution box 420, filter media 434 and 438, diffuser pipes **440*a* and 440*b*, a strainer 450 to 470, a treated water storage tank 480, and a controller (not illustrated). The sewage treatment plant 120 according to an embodiment of the present invention includes the plurality of sewage filtration apparatuses 400**, sensors (not illustrated), valves (not illustrated), and cooling pipes (not illustrated) and the controller (not illustrated).

The influent water box 410 receives sewage and wastewater (corresponding to cooling water) to be treated from the outside. The influent water box 410 receives sewage and wastewater from the outside and delivers the incoming wastewater to the distribution box 420 via an inflow pipe 415.

The distribution box 420 vertically upward distributes the sewage and wastewater that has been introduced through the influent water box 410, or receives backwashing water (corresponding to the cooling water) directly from an upper side thereof and discharges the backwashing water to the outside.

The sewage and wastewater that has gone through the inflow pipe 415 is introduced into the distribution box 420. The distribution box 420 receives the sewage and wastewater and distributes the sewage and wastewater vertically upward (a direction in which the filter media 434 and 438 are present).

On the contrary, the distribution box 420 receives the backwashing water directly from the upper side thereof, and discharges the backwashing water to the outside. If the filtration of the sewage and wastewater has been performed for a predetermined time, the backwashing of the filter media 434 and 438 needs to be performed. Such backwashing is performed as the backwashing water is discharged via nozzles 470 from the treated water storage tank 480 to the filter media 434 and 438. The backwashing water that has washed the filter media 434 and 438 is introduced into the distribution box 420. An inlet valve 429 of the distribution box 420 is closed and an outlet valve 426 thereof is opened so that the introduced backwashing water is discharged to the outside.

The filter media 434 and 438 physically remove solid matters and also biologically oxidize organic matters from the sewage and wastewater introduced thereto.

The filter media 434 and 438 has smaller specific gravity than water and rises along with the sewage and wastewater when the sewage and wastewater is introduced thereto. The filter media 434 and 438 rises up to a height at which a strainer block 450 is disposed along with the sewage and wastewater, and starts to be packed without further rising by the strainer block 450. The packed filter media 434 and 438 remove the solid matters or the organic matters. Meanwhile, if the backwashing water is introduced into the reaction tank 430 in order to backwash the filter media 434 and 438, alien substances of the filter media 434 and 438, which have been accumulated in the filtration process, are backwashed by the backwashing water depending on the sizes of the alien substances.

FIG. 4 illustrates that the filter media having a plurality of sizes has been included in the sewage filtration apparatus 400, but is not essentially limited thereto. Only one kind of filter medium having a uniform size may be included in the sewage filtration apparatus 400.

The diffuser pipes 440*a* and 440*b* supply air for the growth of microbes or the backwashing of the filter media 434 and 438.

The diffuser pipe 440*a* is disposed within the reaction tank 430 and supplies oxygen to the filter medium 438. The diffuser pipe 440*a* supplies an electron accepter that is necessary for aerobic microbes to oxidize organic matters. The diffuser pipe 440*a* may supply oxygen, that is, the electron acceptor, by supplying the air, but may supply pure oxygen according to circumstances.

Meanwhile, the diffuser pipe 440*b* is disposed at an arbitrary location within the reaction tank 430 and supplies backwashing air for the backwashing of the filter media 434 and 438. Solid matters or organic matters that have been grown on or attached to the filter media 434 and 438 may be washed out by the backwashing water, but the diffuser pipe 440*b* may also supply the backwashing air in order to improve backwashing efficiency.

The strainer 450 to 470 includes the strainer block 450 and the nozzles 470.

The strainer block 450 spatially separates the reaction tank 430 and the treatment water storage tank 480.

The strainer block 450 includes nozzle holes 460 so that the nozzles 470 can be disposed at preset intervals. The nozzle 470 is disposed in each nozzle hole 460. Likewise, a hole that transmits a fluid, such as the air or a liquid, but does not transmit the filter media 434 and 438 and that has a fine size is also formed in the nozzle 470. Accordingly, the nozzles 470 introduce the treated water (oxygen) into the treated water storage tank, and spray the backwashing water to the reaction tank 430.

The treated water storage tank 480 receives the treated water (corresponding to the cooling water) that has gone through the filter media 434 and 438 and discharges the treated water to the outside or receives the backwashing water from the outside and discharges the backwashing water to the filter media 434 and 438.

The sewage filtration apparatus 400 has such a construction and may perform biological filtration or high-speed filtration. The sewage filtration apparatus 400 that operates as described above may be included in the sewage treatment plant 120 in a plural number as illustrated in FIG. 5. For example, if the sewage filtration apparatus 400 is intended to perform biological filtration, approximately 40 places may be included in the sewage treatment plant 120. If the sewage filtration apparatus 400 is intended to perform high-speed filtration, approximately 8 places may be included in the sewage treatment plant 120.

Likewise, the sewage treatment plant 120 includes the sensors (not illustrated), the valves (not illustrated), the cooling pipes (not illustrated), and the controller (not illustrated) that have been described along with the plurality of sewage filtration apparatuses 400. Each of the component except the sewage filtration apparatus 400 operates similarly to that described above and performs the exchange of heat between the coolant and the cooling water that have been introduced into the cooling pipe (not illustrated). The controller (not illustrated) determines a degree of the distribution of the coolant to the sewage filtration apparatus by determining whether a water temperature of the cooling water is greater than a preset reference value or whether a difference between a water temperature of the coolant and the water temperature of the cooling water is greater than the preset reference value. Accordingly, the sewage treatment plant 120 including the sewage filtration apparatus 400 can also fluidly perform the exchange of heat with the coolant depending on the temperature.

Figure 6:
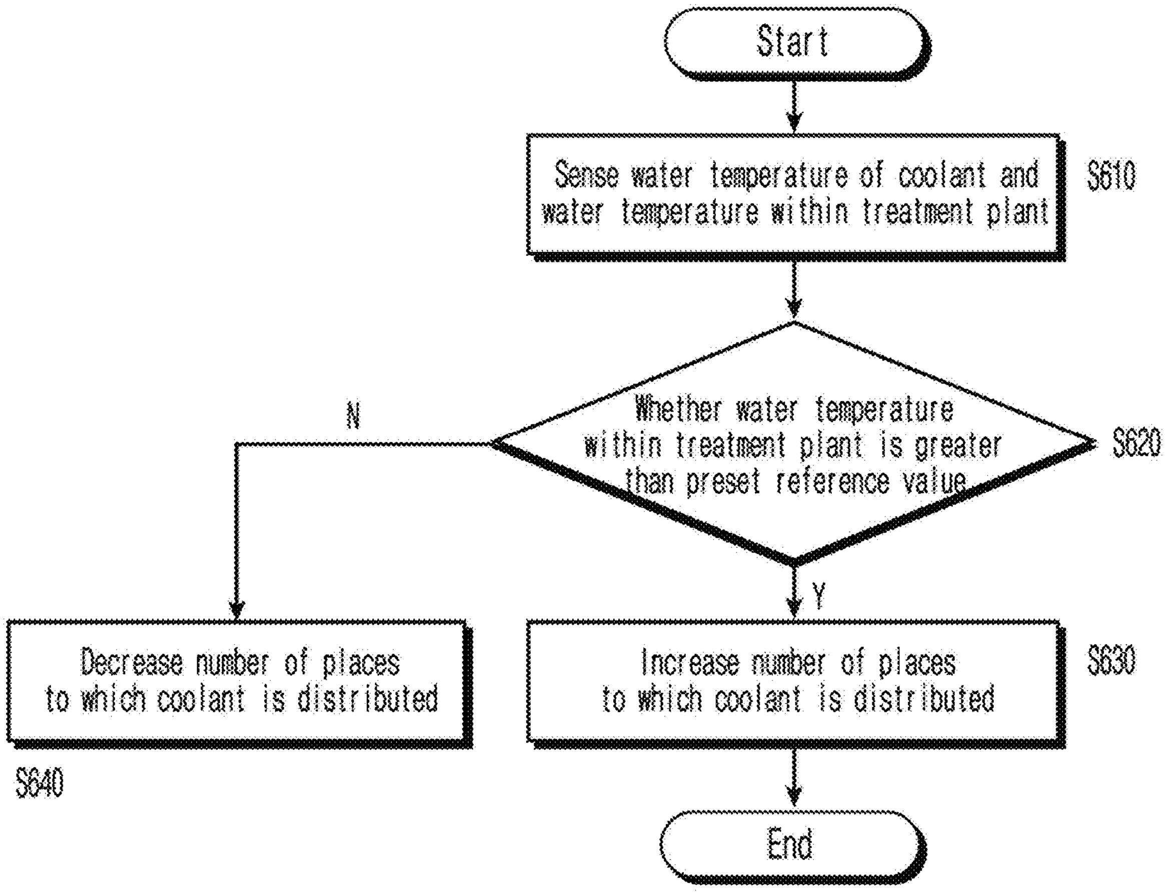
FIG. 6 is a flowchart illustrating a method of cooling, by the sewage treatment plant according to an embodiment of the present invention, a coolant that flows between the sewage treatment plant and the data center.

FIG. 6 is a flowchart illustrating a method of cooling, by the sewage treatment plant according to an embodiment of the present invention, a coolant that flows between the sewage treatment plant and the data center.

The sewage treatment plant 120 senses a water temperature of a coolant and a water temperature within the treatment plant (S610).

The sewage treatment plant 120 determines whether the water temperature within the treatment plant is greater than a preset reference value (S620), but the present disclosure is not essentially limited thereto. The sewage treatment plant 120 may determine whether a difference between the water temperature of the coolant and a water temperature of cooling water within the treatment plant is greater than the preset reference value.

When the water temperature is greater than the preset reference value, the sewage treatment plant 120 increases the number of places to which the coolant is distributed (S630). The sewage treatment plant 120 increases the number of places of the biological reaction tank or the sewage filtration apparatus included in the sewage treatment plant, to which the coolant is distributed, and also increases the number of tanks to which the coolant is distributed within each place.

When the water temperature is not greater than the preset reference value, the sewage treatment plant 120 decreases the number of places to which the coolant is distributed (S640). The sewage treatment plant 120 decreases the number of places of the biological reaction tank or the sewage filtration apparatus included in the sewage treatment plant, to which the coolant is distributed, and also decreases the number of tanks to which the coolant is distributed within each place.

Figures 7A, 7B:
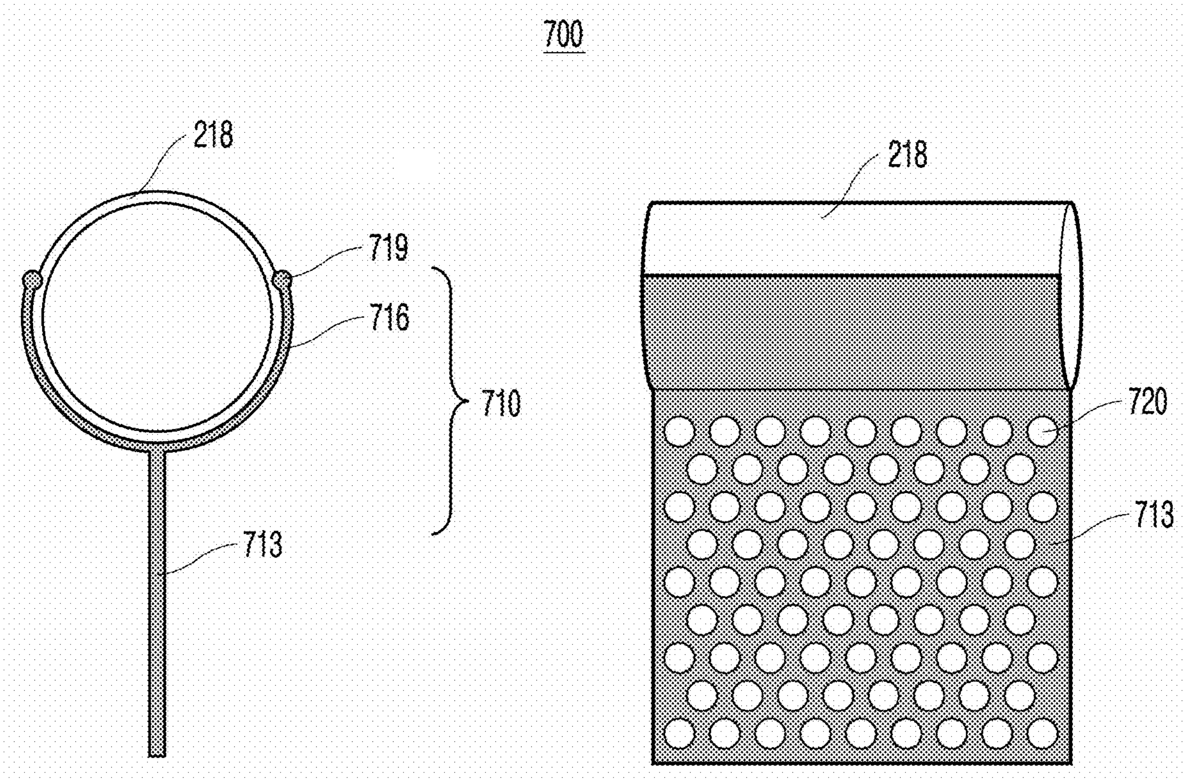
FIGS. 7A and 7B are diagrams illustrating a construction of a heat exchanger according to a first embodiment of the present invention.
Figure 8A:
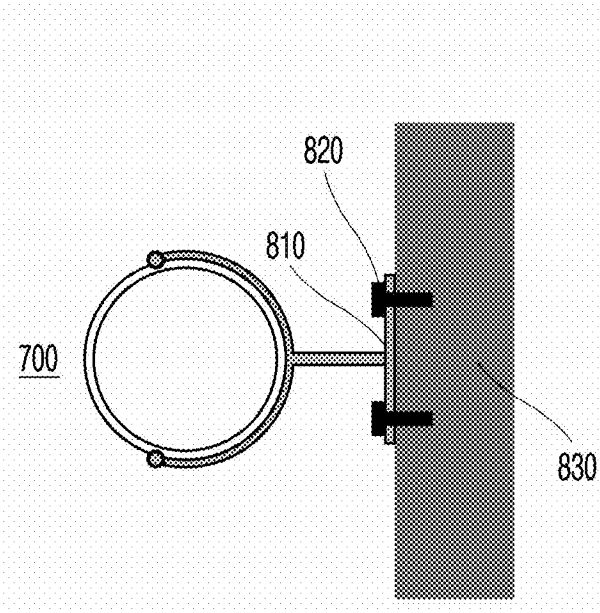
FIGS. 8A and 8B are diagrams illustrating an example in which the heat exchanger according to the first embodiment of the present invention is installed at each component of the sewage treatment plant.
Figure 8B:
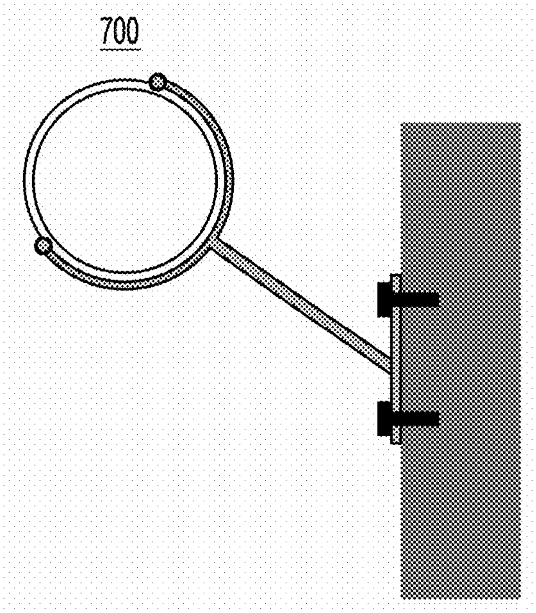

FIGS. 7A and 7B are diagrams illustrating a construction of a heat exchanger according to a first embodiment of the present invention. FIGS. 8A and 8B are diagrams illustrating an example in which the heat exchanger according to the first embodiment of the present invention is installed at each component of the sewage treatment plant.

Referring to FIGS. 7A and 7B, the heat exchanger 700 according to the first embodiment of the present invention includes a body part 710 and through holes 720. The body part 710 includes a body 713, a support part 716, and an anti-detachment part 719.

The heat exchanger 700 enables the cooling pipes to be disposed and fixed to various components within the sewage treatment plant 120 and also enables the exchange of heat with the cooling water within a place where the heat exchanger is disposed to be smoothly performed.

The heat exchanger 700 supports the cooling pipe 218, and is fixed and disposed in various reaction tanks within the sewage treatment plant. In order for the coolant to be subjected to the exchange of heat with the cooling water within the sewage treatment plant 120, the cooling pipe 218 may need to be disposed within various components (the reaction tank) within the sewage treatment plant 120. To this end, the cooling pipe 218 is seated and fixed to one end of the heat exchanger 700, and the other end of the heat exchanger 700 is fixed to various components within the sewage treatment plant 120. Accordingly, the heat exchanger 700 fixes the cooling pipe 218 within the sewage treatment plant 120.

The heat exchanger 700 smoothly performs the exchange of heat between cooling water within a place where the heat exchanger is disposed and a coolant that flows into the cooling pipe 218. The body part 710 of the heat exchanger 700 is implemented by using a component having thermal conductivity greater than a preset reference value so that heat from the cooling pipe 218 can be smoothly conducted to the body part 710. Accordingly, the exchange of heat between the coolant within the cooling pipe 218 and the cooling water that passes through the body part can be smoothly performed.

The body 713 connects a fixing plate 810 and the support part 716 and performs the exchange of heat with the cooling water without hindering a flow of the cooling water.

The body 713 is implemented in a shape having a predetermined area, for example, a rectangle, and has one end connected to the fixing plate 810 and the other end connected to the support part 716. The body part 710 can be fixed to the wall body 830 by the connections of both ends of the body 713.

The body 713 performs the exchange of heat with the cooling water without hindering a flow of the cooling water. As described above, the body 713 may be implemented by using a component having thermal conductivity having a higher value the preset reference value, for example, aluminum or stainless steel that is resistant to corrosion. Furthermore, as illustrated in FIG. 7B, the body 713 includes the plurality of through holes 720 therein. Since the plurality of through holes 720 is included, the body 713 does not hinder a flow of cooling water that flows toward the body 713 and may also contact with the cooling water with a larger area. Heat that is transferred from the cooling pipe 218 can be exchanged with the cooling water because a larger area of the body 713 contacts with the cooling water.

The support part 716 has a shape in which the cooling pipe 218 can be seated, is connected to the one end of the body 713 and seats and fixes the cooling pipe 218.

The support part 716 has a shape in which the cooling pipe 218 can be seated. For example, if the cooling pipe 218 has a circle, the support part 716 may be implemented as a semicircle in order to have the cooling pipe 218 seated therein.

Like the body 713, the support part 716 is implemented by using a component having thermal conductivity greater than a preset reference value and is connected to the one end of the body 713. Like the body 713, the support part 716 is implemented by using a component having high thermal conductivity, for example, aluminum or stainless steel, and delivers heat generated from the cooling pipe 218 to the body 713. Furthermore, the support part 716 can be supported and fixed to the body 713 because a part of the support part 716 is connected to the one end of the body 713.

The anti-detachment part 719 may be formed at each end of the support part 716. The anti-detachment part 719 is a structure having a greater thickness than other portion of the support part 716 that neighbors the anti-detachment part and prevents the cooling pipe 218 seated in the support part 716 from being detached therefrom.

An end of the body part 710 having such a structure on a side opposite to the end of the body part, which is connected to the support part 716, is connected to the fixing plate 810. The body part 710 may be manufactured integrally with the fixing plate 810, and may be physically connected to the fixing plate 810 by welding, etc. The fixing plate 810 is disposed in a wall body 830 in various spaces within the sewage treatment plant 120 in which the cooling pipe 218 will be disposed and positions the heat exchanger 700.

A fixing member 820 fixes the fixing plate 810 to the wall body 830. For example, the fixing plate 810 may have a structure into which the fixing member 820, such as a screw thread, can be inserted. The fixing member 820 is inserted into the corresponding structure and can fix the fixing member 820 and the wall body 830. Accordingly, the fixing plate 810 is fixed to the wall body 830, and the heat exchanger 700 connected to the fixing plate 810 can be disposed and fixed in various spaces within the sewage treatment plant 120.

In this case, as examples of various spaces within the sewage treatment plant 120, a settling basin, an aerobic tank, an anaerobic tank, a filtering apparatus, etc. are present. The heat exchanger 700 may be fixed to the wall body within such various spaces.

As illustrated in FIG. 8A, the heat exchanger 700 can contact with the cooling water a lot and perform the exchange of heat with the cooling water because the heat exchanger 700 is disposed and fixed to the wall body 830 in a direction perpendicular to the wall body 830.

However, in a case in which a flow velocity of the cooling water within the space in which the heat exchanger 700 has been disposed is fast in a specific direction, if the heat exchanger 700 is disposed and fixed in the aforementioned direction in a lump, there may occur problems in that friction between the cooling water and the body 713 is increased, a flow of the cooling water is hindered, and the lifespan of the body 713 is also reduced. In order to prevent the problems, if a flow velocity of the cooling water within the space in which the heat exchanger 700 has been disposed is fast in a specific direction, the heat exchanger 700 may be disposed to have an angle in the corresponding direction as in FIG. 8B. Accordingly, a degree that the heat exchanger 700 hinders a flow of the cooling water can be minimized, and the lifespan of the body 713 can also be increased.

Figure 9A:
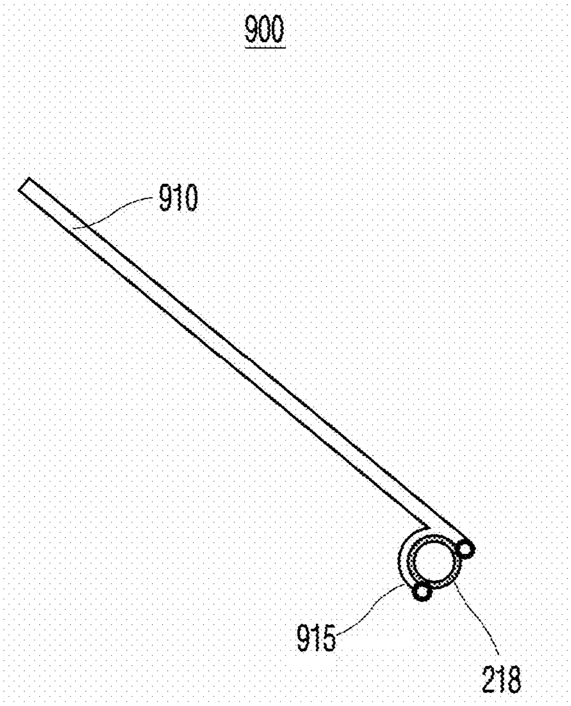
FIGS. 9A and 9B are diagrams illustrating a construction of a heat exchanger according to a second embodiment of the present invention.
Figure 9B:
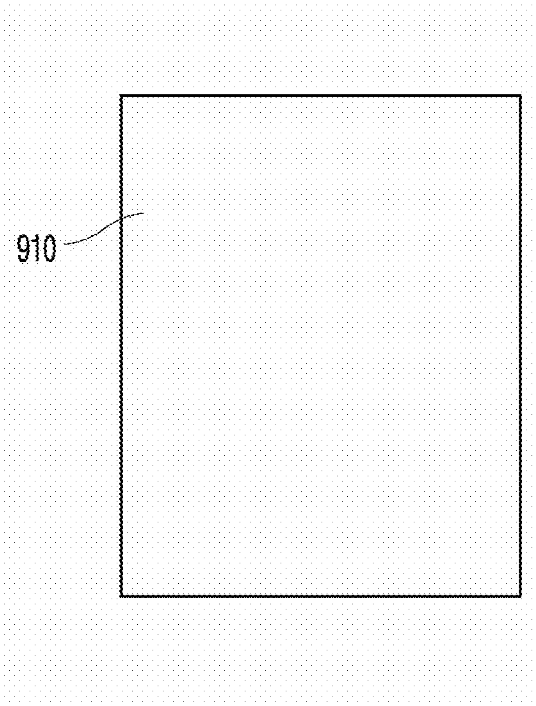
Figure 10A:
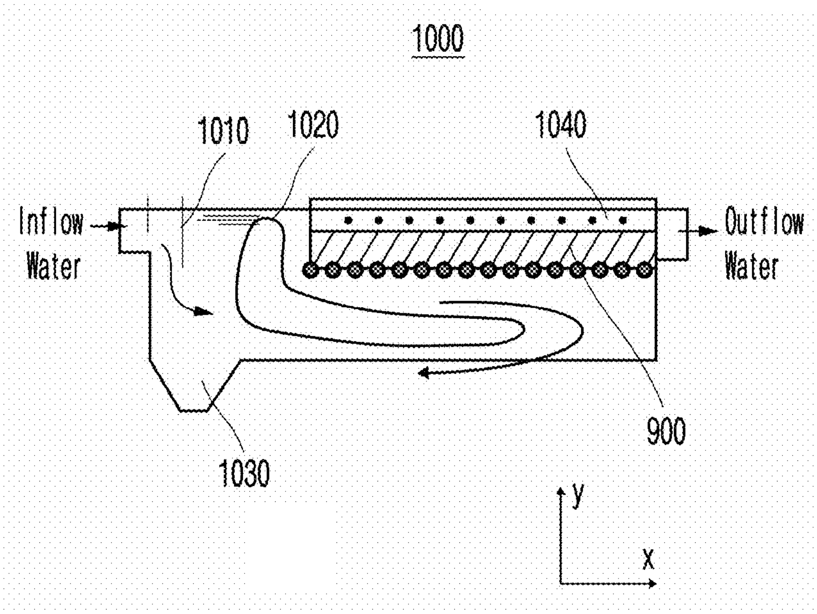
FIGS. 10A and 10B are diagrams illustrating an example in which the heat exchanger according to the second embodiment of the present invention is installed at a settling tank of the sewage treatment plant.
Figure 10B:
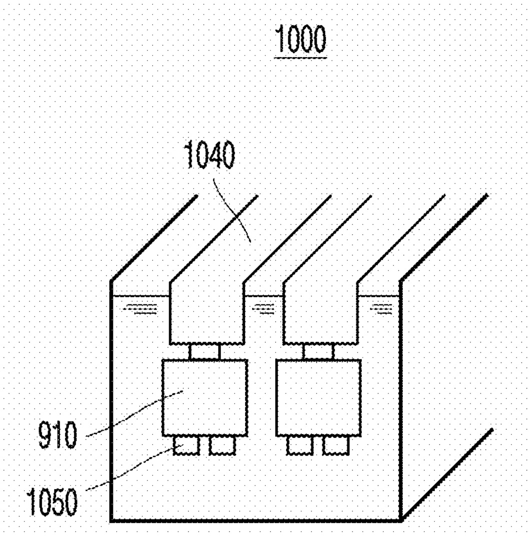

FIGS. 9A and 9B are diagrams illustrating a construction of a heat exchanger according to a second embodiment of the present invention. FIGS. 10A and 10B are diagrams illustrating an example in which the heat exchanger according to the second embodiment of the present invention is installed at a precipitation reservoir of the sewage treatment plant. FIG. 10B is a diagram illustrating a y axis cross section of a portion of a trough 1040 in FIG. 10A.

The heat exchanger 900 according to the second embodiment of the present invention in FIGS. 9A and 9B has characteristics similar to those of the heat exchanger 700. Like the heat exchanger 700, the heat exchanger 900 includes a body, a support part, and an anti-detachment part. Each of the body and the support part is implemented by using a component having high thermal conductivity.

However, the heat exchanger 900 is disposed specifically to the settling tank. Accordingly, it is preferred that the heat exchanger has a structure which may help the settling of solids rather than preventing a flow of cooling water. Accordingly, the heat exchanger 900 includes a body 910 not having a through hole and a support part 915 connected to one surface of the body 910 not one end of the body 910. The heat exchanger 900 is disposed in the settling tank 1000 as in FIG. 10.

The settling tank 1000 discharges only supernatant by separating sludge and the supernatant included in inflow water.

The settling tank 1000 includes a rectifying plate 1010, a sludge collection part 1020, a sludge storage part 1030, and the trough 1040, and may further include a support frame 1050.

The rectifying plate 1010 is disposed to be close to an inlet port through which inflow water is introduced into the settling tank, performs a uniform and constant velocity distribution, and prevents the occurrence of a turbulence. If the inflow water is introduced into the settling tank 1000 without separate restriction, a turbulence at the introduction of the inflow water occurs, and the inflow water hinders the settling of sludge within the inflow water. In order to prevent such problems, the rectifying plate 1010 is located in the inlet port. The rectifying plate 1010 includes a plurality of through holes (described later with reference to FIG. 11) therein and prevents the occurrence of a turbulence so that the inflow water is uniformly distributed.

The sludge collection part 1020 moves settled sludge to the sludge storage part 1030. The sludge collection part 1020 is located in a middle part of the settling tank 1000, and is rotated in a direction (a clockwise direction in FIG. 10A) toward the sludge storage part 1030. Rotatory power of the sludge collection part 1020 generates a stream toward the sludge storage part 1030 so that the settled sludge can be moved to the sludge storage part 1030.

The sludge storage part 1030 stores the sludge introduced therein. The sludge storage part 1030 is a component that is formed relatively in a bottom part of the settling tank 1000 in a groove form so that the sludge moved by the sludge collection part 1020 is introduced into the sludge storage part 1030.

The trough 1040 is formed at one location within the settling tank 1000 so that the heat exchanger 900 is connected thereto at a predetermined slope and disposed therein. The trough 1040 is disposed at the top of the settling tank 1000 so that supernatant that is introduced into the trough 1040 can be discharged to the outside of the settling tank 1000. In this case, the heat exchanger 900 is connected to the bottom (a direction toward the bottom of the settling tank) of the trough 1040 with a slope. The trough 1040 and the heat exchanger 900 are physically connected by using a method, such as welding or fastening.

In this case, the body 910 within the heat exchanger 900 is disposed so that the support part 915 and the cooling pipe 218 seated in the support part 915 are directed toward the bottom of the settling tank 1000. Although the rectifying plate 1010 is present, the inflow water is circulated by the sludge collection part 1020. In this case, if the speed of the inflow water that rises is faster than the weight of the sludge, the sludge is not settled and rises along with the circulation of the inflow water. The body 910 of the heat exchanger 900 does not include a through hole, and thus the sludge that has risen descends along the slope of the body 910. That is, the body 910 itself accelerates the settling of the sludge because the body 910 does not have a through hole and is disposed in a form having a slope. Furthermore, the sludge that descends along the body 910 should not be hindered by a structure, such as the support part 915. Accordingly, the structure, such as the support part 915, is disposed toward the aforementioned direction.

As described above, the heat exchanger 900 performs the exchange of heat between the coolant and the cooling water and improves settling efficiency of the sludge in the settling tank 1000.

The settling tank 1000 may further include the support frame 1050. The support frame 1050 supports the heat exchanger 900 under the heat exchanger 900. The support frame 1050 is disposed at both ends of the settling tank 1000 in one direction (an x axis direction in FIG. 10(*a*)) of the settling tank 1000 and fixed thereto, and is located under the heat exchanger 900 and supports the heat exchanger 900.

In FIGS. 9A, 9B, 10A and 10B, only one support part 915 within the heat exchanger 900 has been illustrated as being implemented on one surface of the body 910, but the present disclosure is not essentially limited thereto. The support part 915 may be implemented on one surface of the body 910 in a plural number.

Figure 11:
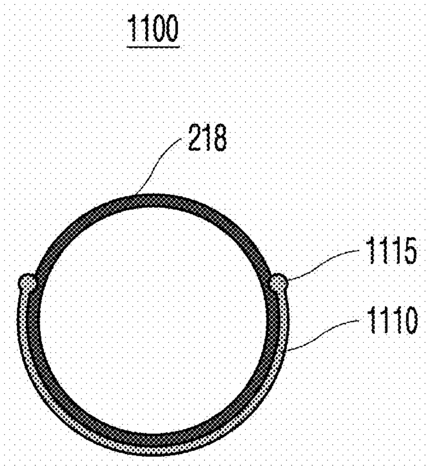
FIG. 11 is a diagram illustrating a construction of a heat exchanger according to a third embodiment of the present invention.

FIG. 11 is a diagram illustrating a construction of a heat exchanger according to a third embodiment of the present invention.

Referring to FIG. 11, the heat exchanger 1100 according to the third embodiment of the present invention includes a support part 1110 and an anti-detachment part 1115.

The support part 1110 and the anti-detachment part 1115 perform the same operations as those of the heat exchanger 700 or the heat exchanger 900. However, a part (basically, may be the center for balance) of the support part 1110 is directly (physically by using a method such as welding or fastening) connected to a structure within a space in which the heat exchanger 1100 will be disposed without a connection with the body part.

Figure 12A:
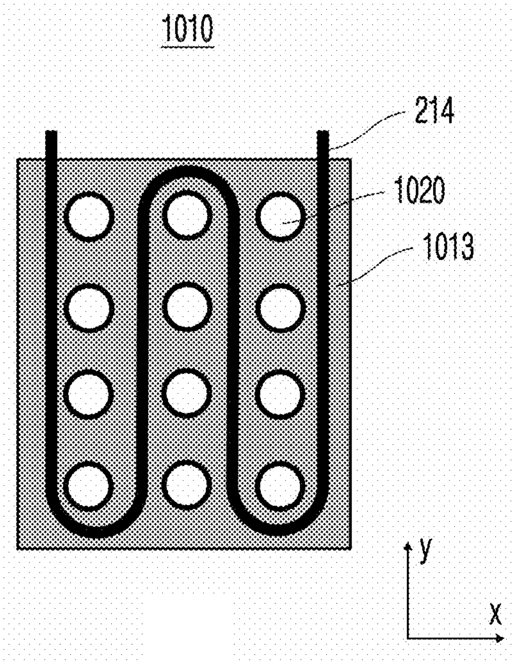
FIGS. 12A and 12B are diagrams illustrating an example in which the heat exchanger according to the third embodiment of the present invention has been implemented in a rectifying plate.
Figure 12B:
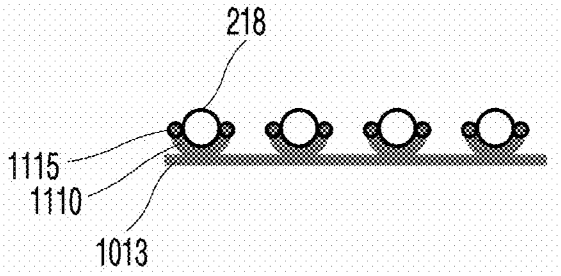

FIGS. 12A and 12B are diagrams illustrating an example in which the heat exchanger according to the third embodiment of the present invention has been implemented in a rectifying plate.

Referring to FIGS. 12A and 12B, a rectifying plate 1010 according to the third embodiment of the present invention includes a body 1013, a plurality of through holes 1020, and a plurality of heat exchangers 1100.

The heat exchanger 1100 may be located even in the rectifying plate 1010 that is located within a settling tank 1000.

The body 1013 is implemented by using a component having thermal conductivity greater than a preset reference value and includes the plurality of through holes 1020 so that some of inflow water can flow. If the body 1013 does not include the through hole 1020, an excessively great drag may be applied to the body 1013 due to a flow of the inflow water into the body 1013. In order to prevent this, the body 1013 includes the plurality of through holes 1020.

The plurality of heat exchangers 1100 is located on a side opposite to a direction in which the inflow water is introduced into the body 1013. The support part 1110 may be manufactured integrally with the body 1013, and may be physically connected to the body 1013 by welding or fastening, etc. In this case, the plurality of the support part 1110 is formed within the body 1013 so that the body 1013 and the cooling pipe 218 can contact with each other as large as possible. As the support part 1110 is formed as described above and the cooling pipe 218 is seated, the exchange of heat occurs between a coolant that flows into the cooling pipe 218 and cooling water that contacts with the rectifying plate 1010. The exchange of heat between the coolant and the cooling water may smoothly occur depending on a structure of the support part 1110.

Figure 13:
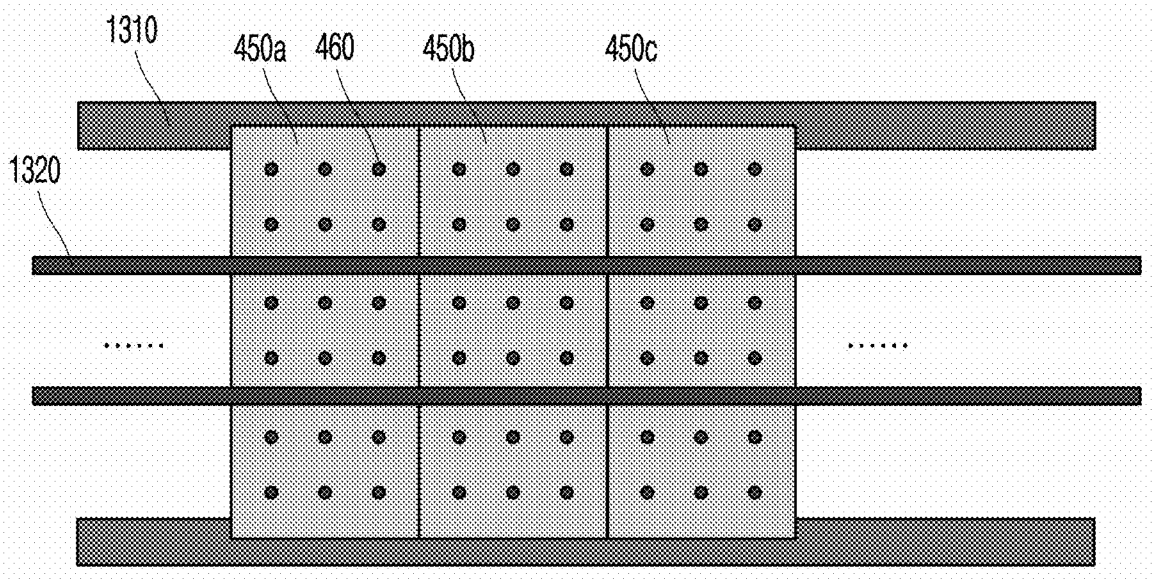
FIG. 13 is a diagram illustrating a construction of a strainer block according to a fourth embodiment of the present invention.
Figure 14A:
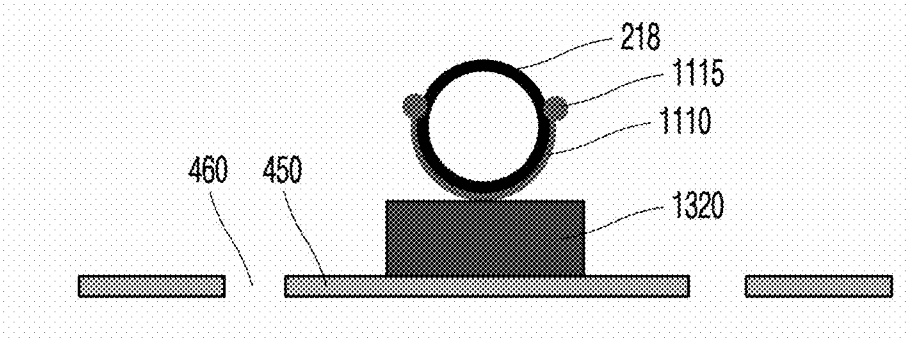
FIGS. 14A, 14B, 14C are diagrams illustrating a construction of a heat exchanger that is installed at the strainer block according to the fourth embodiment of the present invention.
Figure 14B:
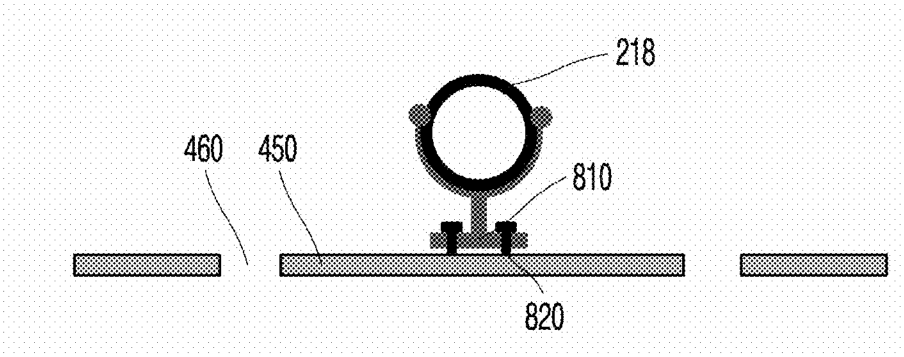
Figure 14C:
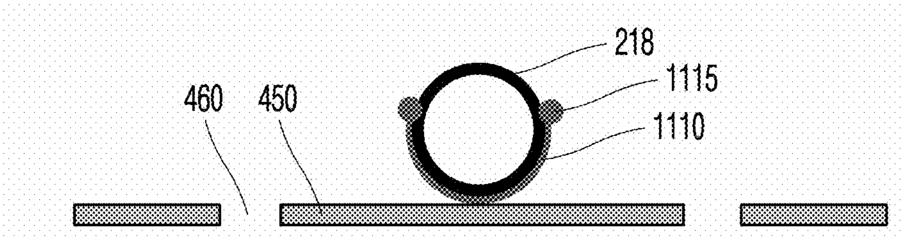
Figure 15:
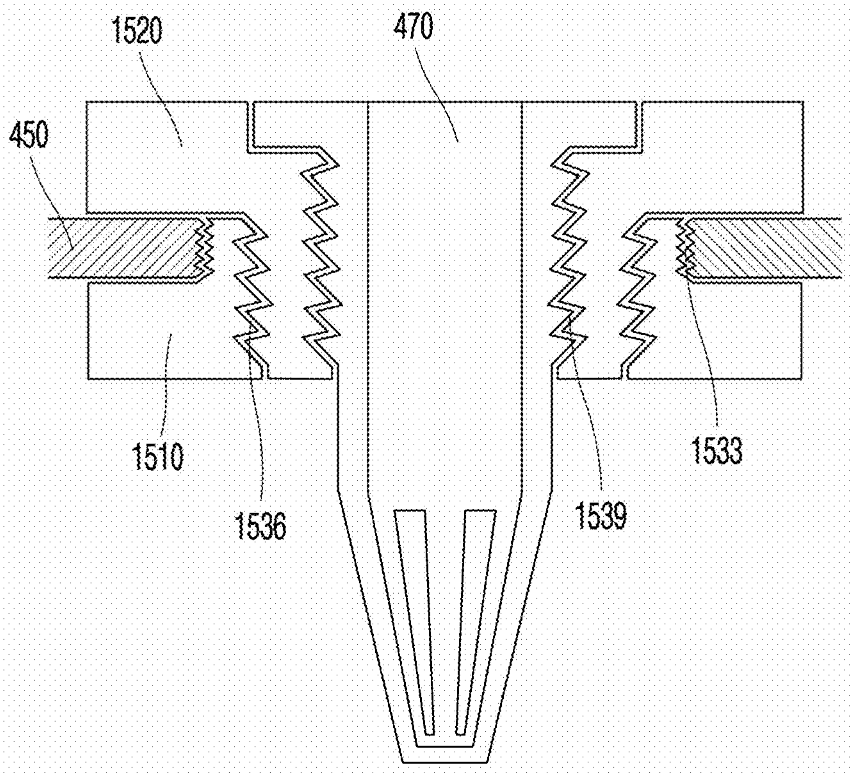
FIG. 15 is a diagram illustrating a strainer according to the fourth embodiment of the present invention.

FIG. 13 is a diagram illustrating a construction of a strainer block according to a fourth embodiment of the present invention. FIGS. 14A, 14B, 14C are diagrams illustrating a construction of a heat exchanger that is installed at the strainer block according to the fourth embodiment of the present invention. FIG. 15 is a diagram illustrating a strainer according to the fourth embodiment of the present invention.

Referring to FIGS. 13, 14A, 14B, and 14C, the heat exchanger may be located even in the strainer block 450 within the sewage filtration apparatus.

As illustrated in FIG. 13, the strainer block 450 is seated at the tops of weirs 1310 disposed at an interval that is relatively smaller than the length of the strainer block 450. In this case, the strainer block 450 may break away from a location where the strainer block 450 has been disposed due to inflow water and the filter media 434 and 438 because the inflow water proceeds to the strainer block 450 as an upflow and the filter media may also move along with inflow water. In order to prevent this, a support frame 1320 may be located at the top (a direction in which the treatment water tank is disposed in the strainer block on the basis of FIG. 4) of the strainer block 450. The support frame 1320 prevents the strainer block 450 from breaking away from the top of the strainer block 450.

If the support frame 1320 is located at the top of the strainer block 450 as described above, a heat exchanger may be located by being implemented as the structure of the heat exchanger 1100 as in FIG. 14A.

The support frame 1320 that contacts with the strainer block 450 is located at the top of the strainer block 450, and the support part 1110 within the heat exchanger 1100 is located by being connected to the top of the support frame 1320. The support part 1110 may be implemented integrally with the support frame 1320, and may be physically connected to the support frame 1320 by welding or fastening, etc. In this case, the support part 1110, the support frame 1320, and the strainer block 450 may each be implemented by using a component (e.g., aluminum or stainless steel) having thermal conductivity greater than a preset reference value. As all of the aforementioned components are implemented by using a component having high thermal conductivity, the exchange of heat may be performed in all surfaces of the strainer block 450.

However, the support frame 1320 may not be located within the sewage filtration apparatus. In such a case, the heat exchanger may be located in the strainer block 450 as in FIG. 14B or 14C.

As in FIG. 14B, a heat exchanger is implemented as the structure of the heat exchanger 700, and the fixing plate 810 is fixed to the strainer block 450 by the fixing member 820. Accordingly, the heat exchanger may be located in the strainer block 450, and may perform the exchange of heat.

In contrast, as in FIG. 14C, a heat exchanger may be located by being implemented as the structure of the heat exchanger 1100. The support part 1110 may be directly fixed and located in the strainer block 450. The support part 1110 may be implemented integrally with the strainer block 450, and may be physically connected to the strainer block 450 by welding, etc. The support part 1110 may be directly connected to the strainer block 450 and may perform the exchange of heat.

As the heat exchanger is directly disposed in the strainer block 450 or is disposed in the support frame 1320 as described above, the cooling pipe 218 is fixed even within the sewage filtration apparatus, and the heat exchanger can perform the exchange of heat with the cooling water.

In this case, the strainer block 450 in which the heat exchanger has been disposed, may have a structure illustrated in FIG. 15. As described above, the strainer block 450 may be implemented by using a component having high thermal conductivity. However, the component having high thermal conductivity is very expensive, and the exchange of heat needs to be rapidly performed. Accordingly, the strainer block 450 may be implemented to have a thin thickness because it is difficult for the strainer block 450 to have a sufficient thickness.

In the strainer block 450, each of the nozzles 470 is located in each of the nozzle holes 460 that have been formed at preset intervals. In order for the nozzle 470 to be prevented from breaking away, fastening needs to be performed between the nozzle 470 and the strainer block 450 by a coupling structure, such as a screw thread. However, the strainer block 450 and the nozzle 470 may not secure a whole clamping force although such a coupling structure is formed because it is difficult for the strainer block 450 to have a sufficient thickness. Accordingly, the strainer 450 to 470 has the structure illustrated in FIG. 15, and is coupled to the nozzle 470.

Referring to FIG. 15, the strainer includes the strainer block 450, the nozzle 470, a first nozzle socket 1510, and a second nozzle socket 1520.

The first nozzle socket 1510 is fastened to the strainer block 450 and the second nozzle socket 1520, and improves a clamping force between the components. The first nozzle socket 1510 has a step having a┴‘ ” form. The height of the step is equal to the height of the strainer block 450. A bottom surface of the step contacts with the strainer block 450 and supports the strainer block 450. A screw thread is formed in a height surface 1533 of the step. Likewise, a screw thread complementary to the formed screw thread is also formed in a surface of the strainer block 450 that comes into contact the height surface 1533 of the step. Accordingly, the height surface 1533 of the step and the strainer block 450 are fastened.

A fastening structure 1536 that improves a clamping force is formed on one surface of the first nozzle socket 1510 in which the step of the first nozzle socket 1510 has not been formed and is fastened to one surface of the second nozzle socket 1520. The fastening structure 1536 formed on the one surface of the first nozzle socket 1510 and the fastening structure 1536 formed on the surface of the second nozzle socket 1520, which comes into contact with the one surface of the first nozzle socket 1510, are fastened to improve a clamping force between both. In this case, the fastening structure may be a sawtooth structure, but the present disclosure is not essentially limited thereto. The fastening structure may be substituted with any structure that improves a clamping force between both that are fastened.

The second nozzle socket 1520 is fastened to the strainer block 450, the first nozzle socket 1510, and the nozzle 470, and improves a clamping force between components and fixes the nozzle.

As described above, the second nozzle socket 1520 is fastened to the one surface of the first nozzle socket 1510 by using the fastening structure 1536.

The second nozzle socket 1520 includes a fastening structure 1539 that improves a clamping force even in one surface thereof that contacts with the nozzle 470. The second nozzle socket 1520 and the nozzle 470 include the fastening structures 1539, respectively, in a surface where the second nozzle socket 1520 and the nozzle 470 contacts with each other, and thus improves a clamping force.

As described above, the strainer block 450, the first nozzle socket 1510, the second nozzle socket 1520, and the nozzle 470 each include the fastening structure 1533, 1536, or 1539 in surfaces thereof, so that the nozzle 470 can be wholly fastened although the strainer block 450 has a thin thickness.

The second nozzle socket 1520 may have a "¬" shape, but may have a step that enables a part of the nozzle 470 to be seated in a surface thereof that comes into contact with the nozzle 470. As the step is included, the nozzle 470 can be disposed more stably.

The processes in FIG. 6 have been described as being sequentially executed, but this merely illustrates the technology spirit of an embodiment of the present invention. In other words, a person having ordinary knowledge in the art to which an embodiment of the present invention pertains may variously modify and change the processes by changing and executing the sequence described in FIG. 6 or executing one or more of the processes in parallel within a range that does not deviate from the intrinsic characteristic of an embodiment of the present invention. Accordingly, FIG. 6 is not limited to a time-series sequence.

Meanwhile, the processes illustrated in FIG. 6 may be implemented in a computer-readable recording medium in the form of a computer-readable code. The computer-readable recording medium includes all types of recording devices in which data readable by a computer system is stored. That is, the computer-readable recording medium includes storage media, such as magnetic storage media (e.g., ROM, a floppy disk, and a hard disk) and optical reading media (e.g., CD-ROM and a DVD). Furthermore, the computer-readable recording medium may be distributed to computer systems connected over a network, and the computer-readable code may be stored and executed in a distributed manner.

The above description is merely a description of the technical spirit of the present embodiment, and those skilled in the art may change and modify the present embodiment in various ways without departing from the essential characteristic of the present embodiment. Accordingly, the embodiments should not be construed as limiting the technical spirit of the present embodiment, but should be construed as describing the technical spirit of the present embodiment. The technical spirit of the present embodiment is not restricted by the embodiments. The range of protection of the present embodiment should be construed based on the following claims, and all of technical spirits within an equivalent range of the present embodiment should be construed as being included in the scope of rights of the present embodiment.

The invention claimed is:

1. A sewage treatment plant for cooling a coolant that radiates heat from each component within a data center by using treated wastewater as a cooling water, wherein the sewage treatment plant is configured to receive sewage and remove organic matters and pollutants within the sewage, wherein a cooling pipe into which the coolant that has radiated heat from each component within the data center flows is disposed within the sewage treatment plant, and a temperature of the coolant that flows into a cooling pipe is lowered by inducing an exchange of heat between the cooling water within the sewage treatment plant and the coolant flowing into the cooling pipe;

wherein the sewage treatment plant is located on the ground within a preset radius of the data center, or located in a basement of a site of the data center; and wherein the sewage treatment plant comprises:

a sensor configured to sense a water temperature of the coolant that flows into the cooling pipe or a water temperature of the cooling water; and a controller configured to determine whether the water temperature of the coolant is greater than a preset reference value based on a sensing value of the sensor, and control whether to distribute the coolant to the cooling pipe that has been disposed within the sewage treatment plant based on a result of the determination.

2. The sewage treatment plant of claim 1, wherein the cooling water comprises sewage and wastewater that has been introduced into the sewage treatment plant or treated water that is being subjected to water treatment in the sewage treatment plant or on which water treatment has been completed.

* * * * *